(12) United States Patent
Peeck et al.

(10) Patent No.: US 12,474,764 B2
(45) Date of Patent: Nov. 18, 2025

(54) METHOD FOR OPERATING AN ELECTRICAL ENERGY SUPPLY DEVICE, COMPUTER PROGRAM AND ELECTRICAL ENERGY SUPPLY DEVICE

(71) Applicant: WAGO Verwaltungsgesellschaft mbH, Minden (DE)

(72) Inventors: Bernhard Peeck, Wiedensahl (DE); Frank Liebl, Loehne (DE); Marvin Hackert, Luhden (DE); Philipp Neugebauer, Bueckeburg (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 655 days.

(21) Appl. No.: 17/864,202

(22) Filed: Jul. 13, 2022

(65) Prior Publication Data
US 2022/0350396 A1 Nov. 3, 2022

Related U.S. Application Data

(63) Continuation of application No. PCT/EP2021/050381, filed on Jan. 11, 2021.

(30) Foreign Application Priority Data

Jan. 14, 2020 (DE) .................. 10 2020 100 662

(51) Int. Cl.
*G06F 1/329* (2019.01)
*G06F 1/3296* (2019.01)
*H02H 9/02* (2006.01)

(52) U.S. Cl.
CPC ............. *G06F 1/3296* (2013.01); *H02H 9/02* (2013.01)

(58) Field of Classification Search
CPC .................. G06F 1/3296; H02H 9/02
USPC .......................................... 323/234
See application file for complete search history.

(56) References Cited

U.S. PATENT DOCUMENTS

| | | | |
|---|---|---|---|
| 7,772,811 B1 * | 8/2010 | Jain ............... | H02M 3/157 323/283 |
| 7,800,877 B2 | 9/2010 | Zeuch et al. | |
| 8,437,111 B1 * | 5/2013 | Cress .............. | H04M 11/062 361/93.7 |
| 10,056,843 B2 | 8/2018 | Zowislok et al. | |

(Continued)

FOREIGN PATENT DOCUMENTS

| | | | |
|---|---|---|---|
| AU | 2017235992 A1 * | 4/2018 | |
| DE | 102005031833 B4 | 1/2007 | |

(Continued)

OTHER PUBLICATIONS

International Search Report dated Mar. 31, 2021 in corresponding application PCT/EP2021/050381.

(Continued)

*Primary Examiner* — Yemane Mehari
(74) *Attorney, Agent, or Firm* — Muncy, Geissler, Olds & Lowe, P.C.

(57) ABSTRACT

A method for operating an electrical energy supply device, in particular a switched-mode power supply device for supplying electrical energy to electrical components from an energy source. A computer program is also provided for carrying out a method of this type, as well as an electrical energy supply device, which is configured to carry out a method of this type.

20 Claims, 2 Drawing Sheets

(56) References Cited

U.S. PATENT DOCUMENTS

| | | | |
|---|---|---|---|
| 10,425,005 B2 | 9/2019 | Henkel et al. | |
| 2007/0008664 A1* | 1/2007 | Zeuch .................... | H02H 3/025 361/18 |
| 2014/0022680 A1* | 1/2014 | Berggren ............... | H02H 7/268 361/87 |
| 2017/0338642 A1* | 11/2017 | Zowislok ............... | H02H 9/002 |
| 2018/0083438 A1* | 3/2018 | Reed ...................... | H05B 47/25 |

FOREIGN PATENT DOCUMENTS

| | | |
|---|---|---|
| DE | 102007007249 A1 | 8/2008 |
| DE | 102014105915 A1 | 10/2015 |
| DE | 102015105476 A1 | 10/2016 |
| DE | 102018124191 A1 | 4/2020 |
| DE | 102019101939 A1 | 7/2020 |

OTHER PUBLICATIONS

International Preliminary Report on Patentability dated Jul. 19, 2022 in corresponding application PCT/EP2021/050381.
Katsuyuki Amanuma et al; "State Feedback Compensation for Repetitive Servo System of DC-DC Converter"—Proceedings of the International Telcommunications Energy Conference, Kyoto, Nov. 5, 1991 pp. 268-274.

\* cited by examiner

METHOD FOR OPERATING AN ELECTRICAL ENERGY SUPPLY DEVICE, COMPUTER PROGRAM AND ELECTRICAL ENERGY SUPPLY DEVICE

This nonprovisional application is a continuation of International Application No. PCT/EP2021/050381, which was filed on Jan. 11, 2021, and which claims priority to German Patent Application No. 10 2020 100 662.4, which was filed in Germany on Jan. 14, 2020, and which are both herein incorporated by reference.

BACKGROUND OF THE INVENTION

Field of the Invention

The present invention relates to a method for operating an electrical energy supply device, in particular a switched-mode power supply device for supplying electrical energy to electrical components from an energy source. The invention also relates to a computer program for carrying out a method of this type, as well as an electrical energy supply device, which is configured to carry out a method of this type.

Description of the Background Art

An electrical energy supply device is used to provide electrical energy on a certain voltage level, for example 12V or 24V, and in a certain voltage type, for example DC voltage, the energy supply device providing this electrical energy supply, for example from a power supply network, such as an AC supply network. The energy supply device includes corresponding components for converting and/or rectifying the electrical energy provided from the power supply network, for example in the form of a clocked conversion circuit, if the device is a switched-mode power supply device, and/or at least one transformer.

Energy supply devices of this type may be equipped with a current limiter. The maximum electrical output current output by the energy supply device is limited by the current limiter. During normal operation of the energy supply device, the maximum output current output by the energy supply device is set to a nominal current of the energy supply device. This current limiter may be equipped with a short-term overcurrent capability. If an overload condition occurs at the output of the electrical energy supply device, this overload condition may be detected by the energy supply device, and the power supply may permit a significantly higher output current than the actual nominal current for a limited period of time.

An energy supply device is known, for example, from DE 10 2005 031 833 B4, which corresponds to US 2007/0008664.

SUMMARY OF THE INVENTION

It is therefore an object of the present invention to specify a further improved electrical energy supply device as well as a method for its operation.

This object is achieved by a method for operating an electrical energy supply device, in particular a switched-mode power supply device, for supplying electrical energy to electrical components from an energy source, the energy supply device including a current limiting apparatus, by means of which the maximum electrical output current output by the energy supply device is limited, the energy supply device including a limiting current function having a temporal dependency, the limiting current function predefining a limiting current, which is an input variable for the current limiting apparatus. Due to a limiting current function of this type, arbitrary function profiles of the limiting current may, in principle, be provided. The limiting current function may thus predefine, for example, a corresponding value of the limiting current at any point in time. The energy supply device may also include multiple limiting current functions, for example, in such a way that a desired limiting current function may be selected by the user.

It is provided that the energy supply device can at least temporarily output an output current, which is influenced by the limiting current predefined by the limiting current function of the current limiting apparatus. The nature of the type of influence of the output current by the limiting current may vary. For example, the output current may be permanently or temporarily limited to the limiting current. If an external load connected to the energy supply device requires a high output current which is greater than the limiting current, the output current may at least temporarily correspond to the limiting current. Deviations between the output current and the limiting current may also be at least temporarily present, for example if a short-term, so-called "soft" short-circuit is to be implemented with a very low-resistance load. During the course of regulating the output current, as is common practice in regulators, minor control deviations between the output current and the limiting current may also occur, which are then compensated for again due to a current regulation.

The limiting current function is therefore an internal functionality of the energy supply device. It is entirely possible that the current profile which sets in at the output of the energy supply device has deviations from the limiting current function, e.g., due to capacitances and/or inductances at connected loads.

It is also provided that, if a load is connected to the energy supply device which requires an output current which is higher than the limiting current, the output current can be regulated to a value below the required output current. In this way, for example, a current regulation for the overcurrent situation may be implemented. If the load no longer requires an output current which is higher than the limiting current, the output current may also return to a lower value than the limiting current.

The output current output by the energy supply device due to the limiting current function can have a time profile, which may be differentiated at all times. For example, the limiting current function may have a constant function profile or, in particular in a digital circuit, a multi-stage or finely stepped function profile. The limiting current function may have a profile which may be differentiated at all times.

The limiting current function can be time-dependent and event-dependent. For example, the limiting current function may be influenced by external signals fed into the electrical energy supply device and be made event-dependent hereby. A time-dependent component of the limiting current function may have, for example, a certain function profile depending on the duration of an elevated load on the energy supply device.

The limiting current function can have at least one function section which falls monotonously or strictly monotonously over time.

The absolute value of the slope in the monotonously falling or strictly monotonously falling function section may not exceed a predefinable or predefined maximum value.

The limiting current function can have at least one point of inflection.

The limiting current function can have a local minimum at at least one point in time or one time segment.

The limiting current function can have the slope of zero and/or constantly the nominal current value specified for the energy supply device in at least one time segment.

The limiting current function can have a dependency on the temperature within and/or in the immediate surroundings of the current limiting apparatus.

The method may include setting the limiting current during a normal operation of the energy supply device to a nominal current of the energy supply device, and, upon detecting an overload condition which requires a higher electrical current to be output by the energy supply device than the nominal current, transferring the limiting current to a first overshooting level, which is much greater than the nominal current. It may additionally be provided that, in the case of a longer-lasting overload condition, the limiting current is transferred to a second overshooting level with the aid of the limiting current function, which is greater than the nominal current and lower than the first overshooting level. In this way, the limiting current may be transferred from the first overshooting level to the second overshooting level with the aid of a transition function, which may be part of the limiting current function. The transition function may have a constant and/or multi-stepped function profile, at least in one time interval.

This has the advantage that, in the case of a limiting current function of this type, no direct (abrupt) switchover from the first overshooting level to the second overshooting level takes place, but instead a transition function may smoothly define the transition from the first overshooting level to the second overshooting level. The limiting current is subsequently adapted in each case to the profile of this transition function. Due to a transition function of this type, various advantages may be achieved, depending on the design of the function profile. For example, a smooth transition from the first to the second overshooting level may be implemented. Intermediate limiting currents may also be implemented during the course of the transition function, which are situated, for example, below the second overshooting level, for example to extinguish an arc which occurred due to the high current of the first overshooting level. In particular, a fast and safe interruption of the current flowing through the arc may be ensured hereby, which has the advantage of an increased safety for connected loads and lines and may protect them against overheating and the risk of fire.

Depending on the design of the limiting current function or the transition function, various improvements to the electrical energy supply device may thus be implemented. A further advantage of the invention is that the electrical energy supply device may be kept cost effective with regard to the hardware structure, since it does not have to be designed for continuously excessively high currents.

For example, if a smooth transition from the first overshooting level to the second overshooting level is implemented at the transition function at least in one time interval, the current regulation of the energy supply device may be relieved hereby, so that the current regulation may better follow the limiting current predefined as the setpoint value. The load on the electrical components of the energy supply device participating in the current regulation may also be reduced.

The transition function may be provided with a highly varied design, as mentioned above. The transition function may thus have a constant function profile in at least one time interval ("constant" in the mathematical sense). In this time interval, the transition function thus does not have any abrupt changes. The transition function may certainly have abrupt changes in other time intervals. For example, the transition function may implement a pause between the phase of the first overshooting level and the phase of the second overshooting level in such a way that the limiting current is transferred during this pause to a level below the second overshooting level, which may take place abruptly or with a smooth transition. During this pause time, the limiting current may remain at a constant value. Due to this pause time, an arc which possibly occurs due to the high limiting current in the phase of the first overshooting level is extinguished again in downstream electrical components, e.g., in electromechanical switches. The downstream electrical components are protected hereby.

A multi-stepped function profile of the transition function may also occur if the limiting currents resulting from the transition function are calculated digitally, e.g., by a computer of the energy supply device. In this case, a constant or at least finely stepped function profile is approximated by a multi-stepped or, to put it better, a many-stepped function profile, in which the step height of the individual steps is selected to be very small.

Particular values of the limiting current can be determined from the limiting current function by a computer of the energy supply device, the computer continuously predefining calculated values of the limiting current of the power limiting apparatus according to the instantaneous point of the limiting current function. This advantageously permits a digital software-controlled implementation of the energy supply device. The computer therefore determines the associated point of the limiting current function or the transition function in a certain cycle for each point in time and predefines a corresponding limiting current of the current limiting apparatus. In this way, the current limiting apparatus may follow the desired limiting current function or transition function with its particular limiting current.

If the computer predefines discrete, calculated limiting currents according to the instantaneous point of the limiting current function, a constant function profile may be at least approximately achieved hereby, in that the differences between calculated limiting current following each other are relatively small, e.g., less than 1 percent of the first overshooting level. As a result, at least one very finely stepped limiting current function or transition function having smooth transitions is implemented.

The transition function can have at least one function section, in which the function profile is strictly monotonously falling. In the aforementioned function section, a reduction of the limiting currents thus permanently occurs over time. The maximum energy input occurring in the electronic components of the energy supply device may be limited hereby to a desired amount.

The strictly monotonously falling function section can directly follow the state, in which the limiting current corresponds to the first overshooting level. As a result, the transition function shows a profile falling over time from the beginning, i.e., starting with the provision of the first overshooting level. In this way, the energy input in the components may be limited to maximally tolerable values from the beginning.

The transition function can have a multi-stepped function profile with at least 16 steps. For example, at least 64 or at least 256 steps may be present. In this way, a more or less continuous transition function may be implemented even in the case of digital signal processing. The transition function thus has an essentially constant function profile. If the transition function is implemented by analog technology, it is advantageous if the first temporal derivation of the transition function is a constant function. Smooth transitions from the first overshooting level to the second overshooting level may be implemented hereby.

The limiting current can be at least temporarily below the first overshooting level during the course of the transition function. The limiting current may thus at least temporarily correspond to the nominal current during the course of the transition function. The pause mentioned at the outset between the first and the second overshooting level may be implemented hereby.

The transition function can have a slope of zero in at least one time interval or over its entire time period. As a result, the limiting current remains at least essentially the same in this time interval or over the entire time period.

The transition function, or in the case of a multi-stepped transition function, a compensation function set by the transition function, can have at least one point of inflection and/or at least one time interval having a constant negative slope. This has the advantage that particularly smooth transitions from the first overshooting level to the second overshooting level may be implemented.

The first overshooting level can be at least four times the nominal current, and/or the second overshooting level is at least 1.2 times the nominal current. The first overshooting level may be, in particular, in the range of five times to ten times the nominal current; the second overshooting level may be in the range of 1.5 times to 2 times the nominal current. In this way, downstream circuit-breakers may be safely tripped with the aid of the first overshooting level in the event of an error. Problematic consumers may be safety started with the aid of the second overshooting level.

The object mentioned at the outset is also achieved by a computer program including program code, configured to carry out a method of the type mentioned above when the method is executed on a computer. The advantages explained above may also be implemented hereby. The method may be executed, for example, on a computer of an electrical energy supply device.

The object mentioned at the outset is also achieved by an electrical energy supply device, in particular a switched-mode power supply device, for supplying electrical energy to electrical components from an energy source, including at least one current limiting apparatus, which is configured to carry out a method of the type mentioned above. The advantages explained above may also be implemented hereby.

The energy supply device may include at least one program memory with a computer program stored therein and a computer for executing the computer program. The computer program may include at least one software control part for implementing the current limiting apparatus. The computer program may furthermore include steps for carrying out a method of the type mentioned above.

The energy supply device may include at least one memory, in which the limiting current function is stored or in which multiple limiting current functions are stored. If multiple limiting current function are stored, the energy supply device may have a selection capability, by means of which a user of the energy supply device may select a desired limiting current function from the stored limiting current functions.

According to a further advantageous embodiment of the invention, it is provided that the limiting current function is active at all times when the energy supply device is switched on. The limiting current function must therefore not be activated only by an external event, such as an overload situation, but is always active at least in the background. This has the advantage that the current limiting apparatus receives a limiting current at all times and therefore does not have a response delay.

The indefinite article a/an is not to be understood as a numeral within the meaning of the present invention. For example, when a component is mentioned, this is to be interpreted in the sense of "at least one component." To the extent that angle details are given in degrees, they relate to a circular dimension of 360 degrees ((360°). To the extent that a computer is mentioned, it may be configured to run a computer program, for example in the sense of software. The computer may be designed as a commercially available computer, for example as a PC, laptop, notebook tablet or smartphone or as a microprocessor, microcontroller or FPGA, or as a combination of elements of this type.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
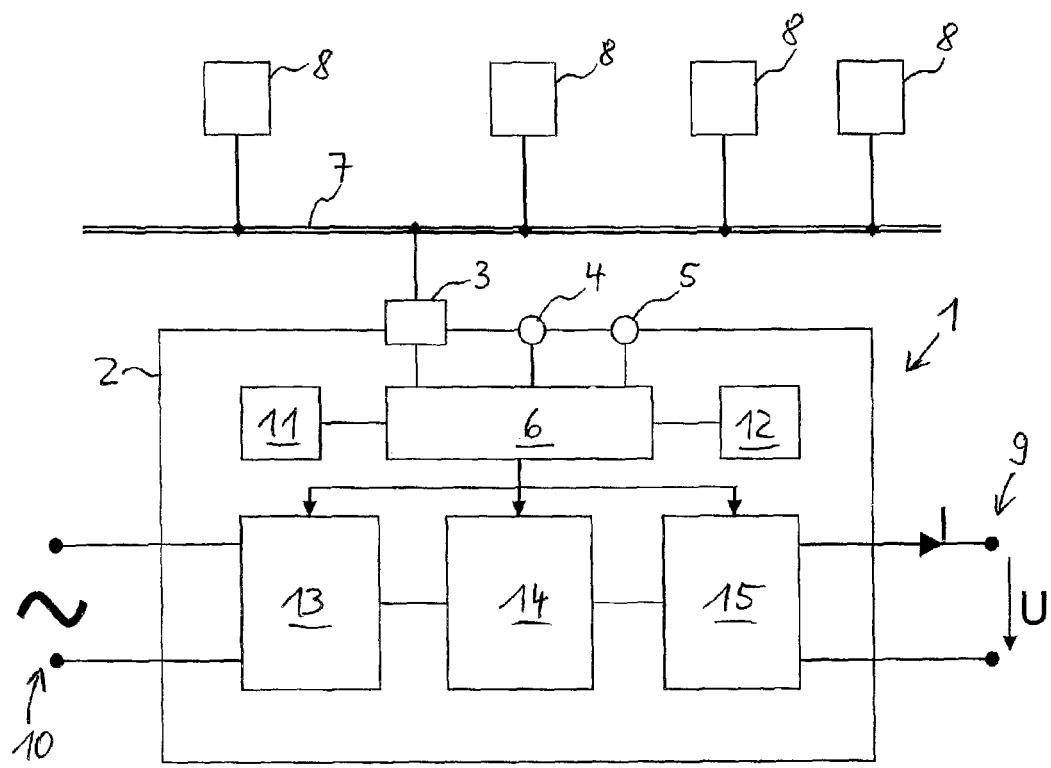
FIG. 1 shows a schematic representation of an energy supply device.

FIG. 1 shows an energy supply device 1, which includes a housing 2. Control electronics 6, 11, 12 of energy supply device 1 are arranged in housing 2. Power electronic components 13, 14, 15 are also situated in housing 2. Energy supply device 1 includes input connections 10, with the aid of which energy supply device 1 is to be connected to a power supply network, e.g., an AC network. Energy supply device 1 is used to convert the electrical energy received from the power supply network via input connections 10 into electrical energy output on the output side, which is provided to energy supply output connections 9. For example, an output current I with an output voltage U, for example a DC voltage, may be provided at energy supply output connections 9.

Power electronic components 13, 14, 15 may comprise primary-side components 13 and secondary-side components 15. A transformer 14 may also be present between primary-side components 13 and secondary-side components 15.

The control electronics include a computer 6, a program memory 11 and a parameter memory 12. Computer 6 is connected to program memory 11 and parameter memory 12. A computer program is stored in program memory 11. The computer program includes software algorithms for controlling power supply functionalities of energy supply device 1, for example a regulation to keep output voltage U and/or output current I and/or a current limiting algorithm constant. Parameters for the user-specific definition of the functionality of energy supply device 1 are stored in parameter memory 12, for example to select different options or operating modes in the software algorithms. Computer 6 executes the computer program and takes into account corresponding parameters from parameter memory 12. Computer 6 controls power electronic components 13, 14, 15 in such a way that a desired output current I and/or a desired output voltage U is/are provided at energy supply output connections 9.

The computer carries out, for example, a remote I/O operating mode via further software algorithms present in the computer program. With respect to the remote I/O operating mode, computer 6 is connected to additional connections of the energy supply device, which comprise at least one controllable digital or analog output connection 4 and at least one digital or analog input connection 5. Computer 6 may read in an input signal, for example a digital value or an analog value, via digital or analog input connection 5. Computer 6 may output a digital or analog output signal at output connection 4. Connections 4, 5 do not have to be connected directly to computer 6 but may be decoupled therefrom via suitable interface circuits.

Computer 6 is also connected to a communication unit 3. Computer 6, and thus energy supply device 1, may carry out a data communication with external computer devices 8 via communication unit 3. In the illustrated exemplary embodiment, computer devices 8 are connected to a data bus 7. Energy supply device 1 is also connected to data bus 7 via its communication unit 3. In this way, a data communication may take place between energy supply device 1 and external computer devices 8. In the case of the remote I/O operating mode, an external computer device 8 may control digital or analog output connection 4 via communication unit 3.

In particular, a current limiting algorithm may be executed in software by computer 6. A current limiting apparatus is then formed by computer 6, the current limiting algorithm executed by the computer and the resulting control of at least one portion of the power electronic components 13, 14, 15. The energy supply device, for example the current limiting algorithm, may have a limiting current function with a temporal dependency, which predefines a limiting current, which is an input variable for the current limiting apparatus.

The limiting function may have a transition function, in which the limiting current initially takes on a first overshooting level and, during the further progression, takes on a second overshooting, as explained at the outset. A transition function 16 may be used for the transition from the first overshooting level to the second overshooting level, as explained below on the basis of the examples in FIGS. 2 through 4. In all representations in FIGS. 2 through 4, the profile of output current I of energy supply unit 1, which is illustrated by the bold line, begins prior to point in time $t_1$ with a current value below nominal current $I_N$. At this point in time, the limiting current corresponds to nominal current $I_N$. At point in time $t_1$, an overload condition occurs, which is detected by energy supply device 1. As a result, the limiting current is transferred to a first overshooting level $I_1$, which is rendered in the illustrated examples as an abrupt or at least rapid transition to first overshooting level $I_1$.

Figure 2:
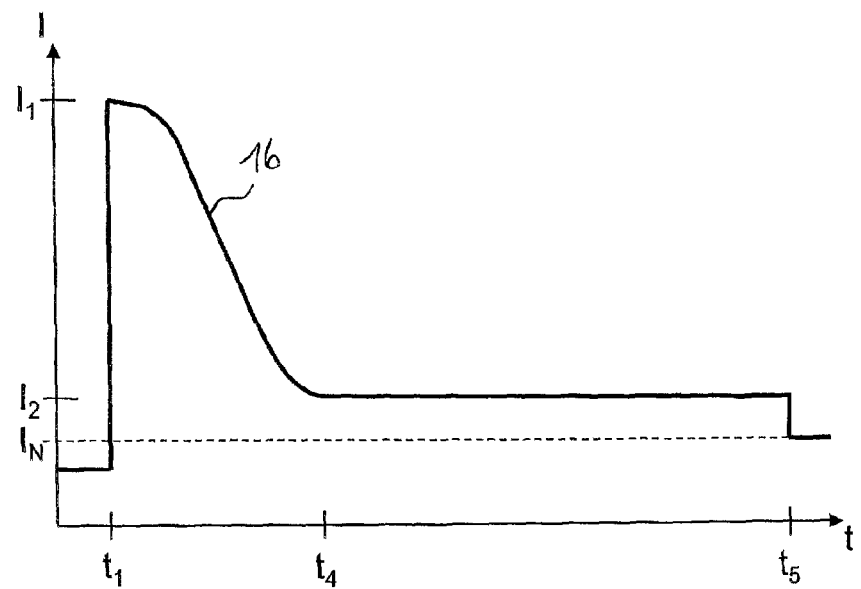
FIGS. 2 through 4 show examples of profiles of transition functions.
Figure 3:
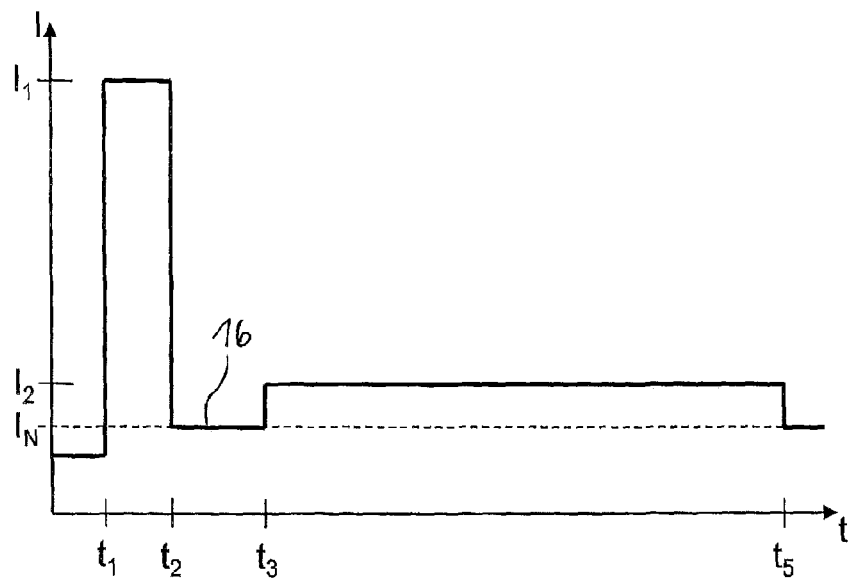
Figure 4:
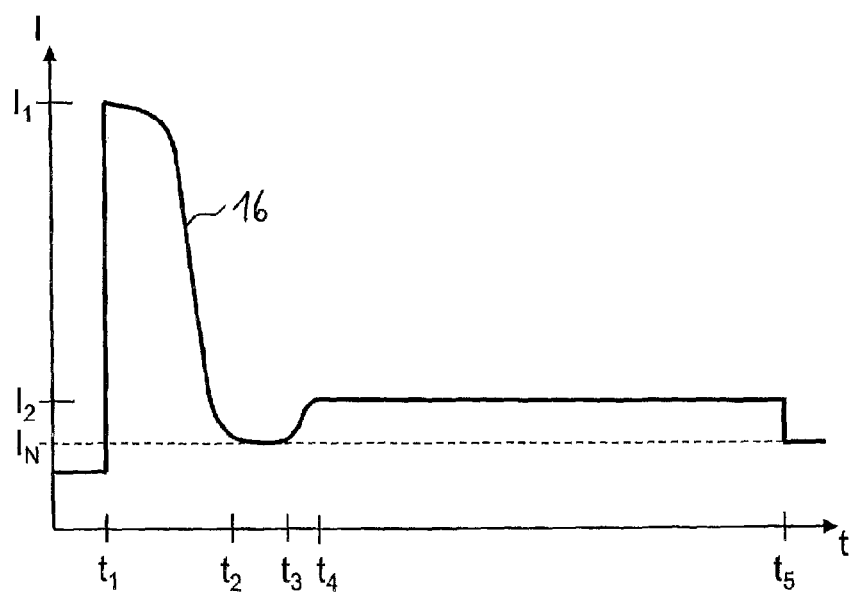

This is followed by transition function 16, during the course of which the limiting current is transferred from first overshooting level $I_1$ to second overshooting level $I_2$ (point in time $t_4$ in FIGS. 2 and 4, point in time $t_3$ in FIG. 3). Second overshooting level $I_2$ is then retained for a period of time until transition function 16 ends at a point in time $t_5$. A transition to another limiting current then occurs, for example to nominal current $I_N$.

A transition function 16 having smooth transitions from first overshooting level $I_1$ to second overshooting level $I_2$ is implemented according to FIG. 2. Transition function 16 begins immediately at the point in time, at which the limiting current has first overshooting level $I_1$, e.g., in such a way that the limiting current has first overshooting level $I_1$ only for a few milliseconds. Transition function 16 then begins immediately with a falling function profile, whose slope is first further reduced in an bow-shaped manner and then transitions into an essentially linearly falling section. The function profile of transition function 16 then transitions in a bow-shaped manner into second overshooting level $I_2$, which is reached at point in time $t_4$. In this way, no abrupt transitions, but rather smooth transitions, occur between the limiting currents, so that the current regulation, and this the electronic components used for the current regulation, are relieved.

FIG. 3 shows a specific embodiment of transition function 16, which begins at point in time $t_2$ and ends at point in time $t_3$. In this case, although abrupt transitions between the limiting currents are present at points in time $t_2$, $t_3$, a pause is implemented by transition function 16 between first overshooting level $I_1$ and second overshooting level $I_2$. For example, during this pause, i.e., between points in time $t_2$ and $t_3$, the limiting current may correspond to nominal current $I_N$ or to another value which is smaller than second overshooting level $I_2$. As mentioned, a possibly occurring arc may be extinguished hereby.

FIG. 4 shows an advantageous specific embodiment of transition function 16, which has a combination of transition functions 16 in FIGS. 2 and 3. Transition function 16 is implemented without abrupt transitions between the limiting currents. In addition, the pause is again implemented between points in time $t_2$ and $t_3$, by means of which the arc may be extinguished. Second overshooting level $I_2$ is reached at point in time $t_2$.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an electrical energy supply device, for supplying electrical energy to electrical components from an energy source, the method comprising:
    providing the energy supply device with a current limiting apparatus, via which a maximum electrical output current output by the energy supply device is limited; and
    providing the energy supply device with a limiting current function that changes over time, the limiting current function predefining a limiting current, which is an input variable for the current limiting apparatus,
    wherein when an overload condition occurs, the limiting current increases to a first overshooting level,
    wherein the limiting current function has at least one transition function section, during which the limiting current decreases from the first overshooting level to a second overshooting level, and
    wherein the limiting current is retained for a period of time at the second overshooting level and then decreases to a third level.

2. The method according to claim 1, wherein the energy supply device at least temporarily outputs an output current, which is influenced by the limiting current predefined by the limiting current function of the current limiting apparatus.

3. The method according to claim 1, wherein, when a load is connected to the energy supply device that requires an output current that is higher than the limiting current, the output current is regulated to a value below the required output current.

4. A method for operating an electrical energy supply device, for supplying electrical energy to electrical components from an energy source, the method comprising:
   providing the energy supply device with a current limiting apparatus, via which a maximum electrical output current output by the energy supply device is limited; and
   providing the energy supply device with a limiting current function that changes over time, the limiting current function predefining a limiting current, which is an input variable for the current limiting apparatus,
   wherein, due to the limiting current function, the output current output by the energy supply device has a time profile, which may be differentiated at all times.

5. The method according to claim 1, wherein the limiting current function is time-dependent and event-dependent.

6. The method according to claim 1, wherein the at least one transition function section of the limiting current function falls monotonously or strictly monotonously over time.

7. The method according to claim 6, wherein an absolute value of a slope in the monotonously falling or strictly monotonously falling function section does not exceed a predefinable or predefined maximum value.

8. A method for operating an electrical energy supply device, for supplying electrical energy to electrical components from an energy source, the method comprising:
   providing the energy supply device with a current limiting apparatus, via which a maximum electrical output current output by the energy supply device is limited; and
   providing the energy supply device with a limiting current function that changes over time, the limiting current function predefining a limiting current, which is an input variable for the current limiting apparatus,
   wherein the limiting current function has at least one point of inflection.

9. The method according to claim 1, wherein the limiting current function has a local minimum at at least one point in time or one time segment.

10. The method according to claim 1, wherein, in at least one time segment, the limiting current function has a slope of zero and/or constantly the nominal current value specified for the energy supply device.

11. The method according to claim 1, wherein the limiting current function has a dependency on a temperature within and/or in immediate surroundings of the current limiting apparatus.

12. The method according to claim 1, wherein the current limiting apparatus is a computer, and wherein particular values of the limiting current are determined from the limiting current function by the computer of the energy supply device, the computer continuously predefining calculated values of the limiting current according to an instantaneous point of the limiting current function.

13. A non-transitory computer-readable medium storing a computer program including a program code that, when executed on a computer, causes the computer to carry out the method according to claim 1.

14. An electrical energy supply device for supplying electrical energy to electrical components from an energy source, the electrical energy supply device comprising:
   at least one current limiting apparatus, via which a maximum electrical current output by the energy supply device is limited; and
   a limiting current function that changes over time, the limiting current function predefining a limiting current, which is supplied to the current limiting apparatus as an input variable,
   wherein the energy supply device is configured to carry out the method according to claim 1.

15. The electrical energy supply device according to claim 14, wherein the energy supply device includes at least one memory, in which the limiting current function is stored or in which multiple limiting current functions are stored.

16. The electrical energy supply device according to claim 14, wherein the limiting current function is active at all times when the energy supply device is switched on.

17. The method according to claim 1, wherein the third level of the limiting current is a nominal current.

18. The method according to claim 1, wherein immediately after the limiting current increases to the first overshooting level, the limiting current begins to decrease to the second overshooting level.

19. The method according to claim 1, wherein during the transition of the limiting current from the first overshooting level to the second overshooting level, the at least one transition function section of the limiting current function implements a pause time period during which the limiting current is decreased to a value that is smaller than the second overshooting level.

20. The method according to claim 19, where the value of the limiting current during the pause time period corresponds to a nominal current.

* * * * *